Patented Aug. 19, 1924.

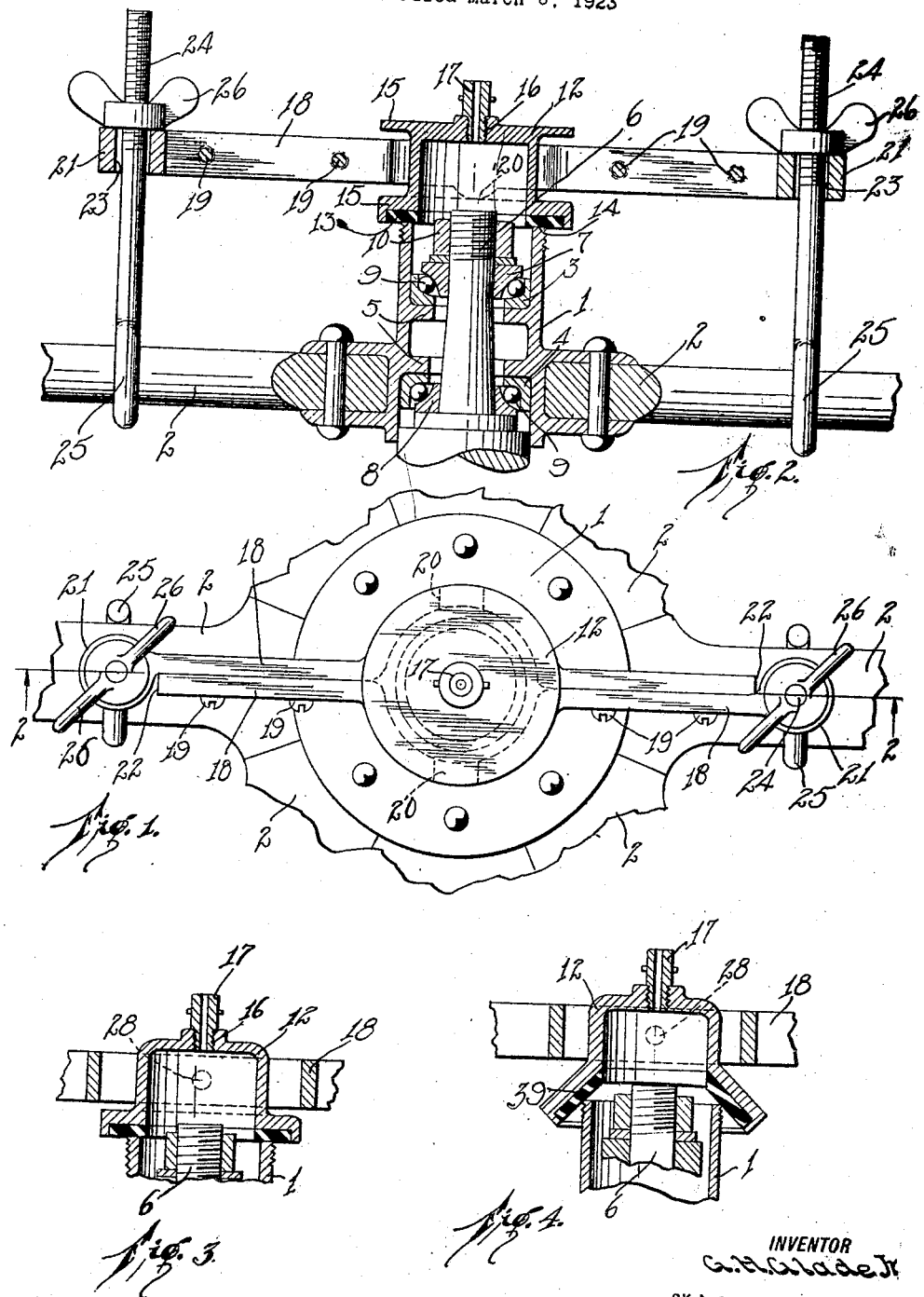

1,505,776

UNITED STATES PATENT OFFICE.

GEORGE H. GLADE, JR., OF CHICAGO, ILLINOIS.

LUBRICATING DEVICE.

Application filed March 8, 1923. Serial No. 623,764.

*To all whom it may concern:*

Be it known that I, GEORGE H. GLADE, Jr., a citizen of the United States, and a resident of Chicago, in the county of Cook and State of Illinois, have invented a new and useful Improvement in Lubricating Devices, of which the following is a full, clear, and exact description.

My invention relates to improvements in lubricating devices, and more particularly to that type of lubricating device employed for lubricating the bearings of a vehicle wheel, and it consists in the combinations, constructions, and arrangements herein described and claimed.

An object of my invention is to provide a lubricating device of the character described by means of which the bearings of the vehicle wheel may be thoroughly lubricated without dismounting the wheel from its axle. This is done by merely removing the hub cap and applying the device to the open end of the vehicle hub.

A further object of my invention is to provide a device of the character described by means of which grease or heavy lubricant may be forced to the innermost parts of the wheel bearing, and thereby thoroughly lubricate the bearings.

A further object of my invention is to provide a lubricating device of the character described to which the ordinary type of grease gun may be applied, various types of force lubricating devices for lubricating various parts of the frame, springs, and other moving parts of the vehicle. These devices may be also allowed to supply the lubricant under pressure in my present improved lubricating device.

A further object of my invention is to provide a lubricating device of the character described that may be applied to wheels having hubs of various diameters.

Other objects and advantages will appear in the following specification, and the novel features of the invention will be particularly pointed out in the appended claims.

My invention is illustrated in the accompanying drawings, forming part of this application, in which—

Figure 1 is a front elevation of an embodiment of my invention operatively applied to a vehicle wheel, Figure 2 is a sectional view along the line 2—2 of Figure 1, Figure 3 is a modified form of my invention, and Figure 4 is still another modified form of my invention.

In carrying out my invention, I make use of a vehicle wheel having a metal hub 1, and a plurality of radially extending spokes 2. The felly and rim of the wheel have been broken away in the drawing so that the hub portion may be enlarged for the purpose of illustration.

The hub 1 is provided with a pair of spaced apart ball races 3 and 4 separated from one another by inwardly extending flanges 5. An axle 6 is provided and has disposed thereupon a pair of ball races 7 and 8. Steel balls 9 are disposed between the adjacent ball races 3 and 7, and 4 and 8, respectively, and a nut 10 is provided on the outer threaded portion of the axle 6 for adjusting the hub bearings so formed. In the drawings, the hub cap has been removed in readiness for the application of my improved lubricating device.

So far the construction is but the ordinary construction of a vehicle wheel and is common and well known in the art.

My present improvement in lubricating device consists in a cup-shaped member 12 having an annular recessed portion 13 at the mouth thereof in which an oil resisting gasket 14 is disposed. The cup-shaped member 12 is provided with a pair of radially extending flanges 15 at opposite ends thereof.

The inner end wall of the cup-shaped member 12 has a threaded bore 16 therethrough in which a coupling 17 is mounted. This coupling 17 is one of two cooperating members employed in the ordinary type of force lubricating devices. The other cooperating part consists in a grease gun having a coupling member at the outlet thereof arranged to engage with the coupling 17 so that a lubricant from the gun may be forced through the coupling on the gun and subsequently through the bore of the coupling 17 into the cup-shaped member 12.

A pair of metal straps 18 are secured to one another by means of machine screws 19 and are bent outwardly intermediate their length to form an annular portion, one strap forming one half of the annulus, and the other strap forming the opposite half. This annular portion entirely encompasses the restricted portion of the cup-shaped member 12, that is, the portion between the radially extending flanges 15. It is therefore impossible for the cup-shaped member 12 to become dislodged from engagement with the straps 18 when the screws 19 are in place. The laterally bent portions of the straps 18 are each provided with downwardly extending rocker projections 20, as shown in dotted lines in Figures 1 and 2. These rocker portions 20 are arranged to contact with the inner face of the flange 15 adjacent the mouth of the cup-shaped member 12 for a purpose hereinafter described.

The straps 18 each have an integral head portion 21. These portions are disposed one on either side of the cup-shaped member 12 and at the outer ends thereof. The opposite strap 18 adjacent the head portion 21 (as assembled) is cut short at 22 so that the head portions may lie with their central point substantially in alinement with the couplings 17.

Each of the head portions 21 is provided with a transverse bore 23 therethrough, through which the threaded stems 24 of hooks 25 are projected. The hooks 25 are arranged to engage with the adjacent spokes 2 of the vehicle wheel in the manner shown in Figure 1. Wing nuts 26 are disposed on the threaded portions 24 so that the straps 18 may be drawn toward the spokes 2 and therefore the cup-shaped member 12 is disposed so that its gasket 14 is in close contact with the outer peripheral edge of the open hub 1.

From the foregoing description of the various parts of the device, the operation thereof may be readily understood. Up to the present time, it has been necessary to remove the vehicle wheel entirely from support upon its axle 6 when it was desired to lubricate the bearings therefor. This necessitated the removal of the nut 10 and the subsequent reassembly of the parts after the lubricant was applied. This procedure, aside from the soiling of the hands or clothes of the person undertaking the task, tends to constantly vary the adjustment of the bearings, a condition not consistent with the proper function of the parts involved.

In lubricating a wheel with my improved lubricating device, I first remove only the hub cap. I next loosen the wing nuts 26 somewhat and apply the hooks 25 to diametrically opposed positions of the spokes 2, and thereupon tighten the wing nuts 26 so that the gasket 14 at the mouth of the cup-shaped member 12 is drawn into oil-tight engagement with the outer peripheral edge of the open hub 1. It will be noted at this time that the gasket 14 will evenly contact the edge of the hub 1. This is due to the fact that even though the straps 18 may not rest parallel with the spokes of the wheel, the pressure upon the cup-shaped member 12 is communicated thereto through the rocker portions 20, and is therefore in a plane which passes through the central portion or axis of the cup-shaped member 12. The member 12 will therefore seat easily upon the hub.

I next attach the cooperating coupling member of the grease gun (not shown, since this structure is common and well known in the art) to the coupling member 17 and operate the gun. As soon as the gun is operated, lubricant will pass through the passage of the coupling 17 into the cup-shaped member 12 and permeate to the numerous parts of the bearings by means of which the hub is rotatably supported on the axle 6. When this space within the hub 1 not occupied by the bearings and the axle has been filled, it is only necessary to loosen the wing nuts 26, remove the hooks 25 from engagement with the spokes, and lay the device aside after replacing the hub cap (not shown). A certain amount of the lubricant will remain in the cup-shaped member 12 and the device may be applied to the next wheel without delay.

In Figure 3 I have shown a modified form of my invention in which the majority of the parts are precisely the same as shown in Figure 1. In this modified form, however, I do not employ the rockers 20 on the straps 18, but instead, I employ stub shafts on the cup, one of which is shown in dotted lines at 28 passing through the walls of the annular portions of the straps 18. These stub shafts 28 are rigidly mounted on the adjacent sides of the cup-shaped member 12. This modified form of my invention operates in precisely the same manner as the preferred form.

In Figure 4 I have shown still another modified form of my invention which is similar in so far as the mounting of the cup-shaped member 12 is concerned, to Figure 3. In this form of my invention, I have employed a tapering gasket 39 in place of the gasket 14 so that the cup-shaped member 12 may be applied to hubs of various diameters. It will therefore be apparent that my lubricating device will be readily adapted for use in a lubricating station or garage where cars of various makes and sizes are kept.

I claim:

1. The combination with a wheel hub having an open outer end, of a cup-shaped member, a gasket disposed on the peripheral outer edge of said cup-shaped member, a cross piece pivotally connected intermediate its length to said cup-shaped member, a pair of clamping members disposed at each end of said cross piece arranged for clamping the vehicle wheel adjacent the hub, whereby said cup-shaped member may be drawn into close contact with said hub, and the gasket thereon may seal the connection between said cup-shaped member and the open outer end of said hub, and means for introducing lubricant under pressure to said cup-shaped member.

2. The combination with a wheel hub having an open outer end, and a cup-shaped member, a cross piece pivotally connected intermediate its length to said cup-shaped member, a pair of clamping members disposed at each end of said cross piece and arranged for engaging with the vehicle wheel adjacent to the hub, whereby said cup-shaped member may be drawn into close contact with said open end of said hub, means for introducing lubricant under pressure to said cup-shaped member.

GEORGE H. GLADE, Jr.